United States Patent [19]

Horikawa et al.

[11] Patent Number: 4,734,570

[45] Date of Patent: Mar. 29, 1988

[54] ACTIVE FOCUS DETECTING DEVICE WITH INFRARED SOURCE

[75] Inventors: Yoshiaki Horikawa, Hachiouji; Kazuo Kajitani, Ina; Noriyuki Miyahara, Hachiouji, all of Japan

[73] Assignee: Olympus Optical Co., Ltd., Tokyo, Japan

[21] Appl. No.: 932,145

[22] Filed: Nov. 18, 1986

[30] Foreign Application Priority Data

Nov. 20, 1985 [JP] Japan .................. 60-260507
Dec. 17, 1985 [JP] Japan .................. 60-282107

[51] Int. Cl.⁴ .................. G02B 7/11; G02B 21/00
[52] U.S. Cl. .................. 250/201; 354/403; 354/404
[58] Field of Search .......... 250/201, 204; 354/400, 354/402–406, 408, 409

[56] References Cited

U.S. PATENT DOCUMENTS 4,474,448 10/1984 Momiyama .................. 354/407
4,625,103 11/1986 Kitamura et al. .................. 250/204

FOREIGN PATENT DOCUMENTS 58-217909 12/1983 Japan .
60-42725 3/1985 Japan .
2122045 1/1984 United Kingdom .

*Primary Examiner*—Edward P. Westin
*Assistant Examiner*—Charles F. Wieland
*Attorney, Agent, or Firm*—Cushman, Darby & Cushman

[57] ABSTRACT

A focus detecting device comprising a light source means capable of alternating producing a pair of infrared light bundles, a light path changing means leading the infrared lights emitted alternately from the light source means toward an objective so as to pass through the periphery of the pupil of the objective through different courses, a contracting optical system arranged between the objective or a tube lens and the image forming surface of the objective or tube lens and having a positive refractive power contracting the position deviations of the infrared light images formed in positions different with the objectives to be used, a light receiving element capable of detecting the position of the infrared light image reflected from the object and a signal processing means detecting the position deviation from the in-focus position of the objective or an imaging lens with the output signal from the light receiving element, in order to enable to obtain a high detecting precision and detecting sensitivity on the objective without requiring to adjust the lens.

11 Claims, 23 Drawing Figures

ACTIVE FOCUS DETECTING DEVICE WITH INFRARED SOURCE

BACKGROUND OF THE INVENTION (a) Field of the Invention

This invention relates to a focus detecting device adapted to such optical instruments and medical instruments as photographic cameras, microscopes, hard endoscopes and retinal cameras.

(b) Description of the Prior Art

For this kind of focus detecting device, there has been conventionally adopted a light projecting detecting method to obtain a focus detecting device high in the response and precision. However, in the focus detecting device of the TTL system, as the projected light overlaps the observing visual field, an infrared light has been used. The visible light and infrared light are so greatly different from each other in the chromatic aberration that some correcting mechanism is required. This fact has become a great problem particularly in a microscope used by replacing objectives different in the chromatic aberration correcting amount. For example, in Japanese Patent Preliminary Publication No. 58-217909, it has been necessary to adjust the focus position of the infrared light by providing a lens system movable for a fixed distance in the optical axis direction. FIG. 1A shows a manner of forming an image with an objective X, the solid line indicating a visible light and the dotted line indicating an infrared light. FIG. 1B shows an image forming manner with an objective Y different from the above. As understood from these drawings, if the image by the visible light is made in the same position M, the image by the infrared light will be made in different positions Nx and Ny, because the chromatic aberration correcting amount is different with the objectives. As a result, the infrared light from a laser diode LD is incident as deviated on a detector D and is judged to be in an out-of-focus state. Therefore, it has been necessary to adjust the focus by moving a correcting lens C as shown in FIG. 1C.

As described above, in the prior art, the infrared light focusing position deviation has been corrected by moving a correcting lens but, as the focus position deviation is different with the objectives, it has been necessary to move the infrared light focusing correcting lens whenever the objectives are replaced.

SUMMARY OF THE INVENTION

In view of the above-mentioned circumstances, a primary object of the present invention is to provide a focus detecting device requiring no focus position correction with a correcting lens.

Another object of the present invention is to provide a focus detecting device wherein a high detecting precision and detecting sensitivity are obtained on all objectives to be used.

According to the present invention, these objects are attained by providing an objective, a light source means projecting an infrared light onto an object through the periphery of the pupil of the objective located in an in-focus position, a reducing optical system provided between the objective or a tube lens and the position of an image formed by this lens and having a positive refractive power reducing the position deviations of infrared light images formed in different positions in the optical axis direction by different objectives, a light receiving means receiving the reflected light from the object through the objective and reducing optical system and a judging means judging whether the objective is in an in-focus position or not by detecting the entering position deviation of the infrared light entering the light receiving means.

According to a preferred formation of the present invention, the reducing optical system is provided to be on the image forming side from the intermediate position between the objective or tube lens and the position of the image formed by this lens so that the position deviation can be easily reduced.

According to another preferred formation of the present invention, the light souce means includes a pair of light emitting elements, light collecting lenses arranged respectively in front of the respective light emitting elements and a prism for directing a pair of light bundles formed by the respective light collecting lenses to the object surface through the objective and a semiconductor position detector is used for the light receiving means so that a signal can be put into the judging means with a real time and, as a result, the focusing speed rises.

According to still another preferred formation of the present invention, the prism included in the light source means is arranged movably in the optical axis direction and is used as a light path changing means so that a high detecting precision and detecting sensitivity can be obtained on all objectives to be used.

According to further another preferred formation, a pair of light bundles reflected by a first beam splitter and emitted from a pair of light emitting elements are directed to the object surface through a second beam splitter provided in a part of a quick return mirror and an imaging lens so that the focus detecting device can be easily built-in within a camera body.

This and other objects of the present invention will become more apparent during the course of the following detailed description and appended claims.

DESCRIPTION OF THE PREFERRED EMBODIMENTS

Figure 1A:
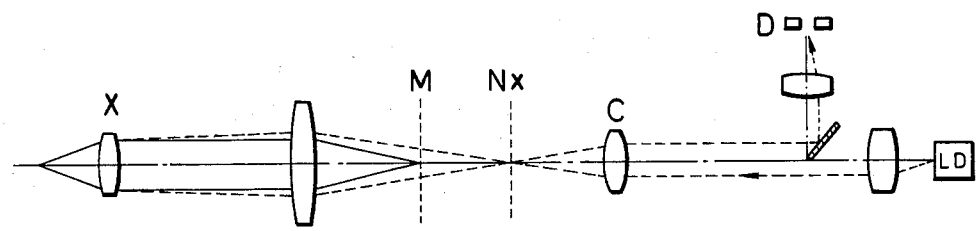
FIGS. 1A, 1B and 1C are views for explaining image forming manners in conventional focus detecting devices.

First of all, the fundamental principle of the focus detecting device applied to the present invention shall be explained with reference to FIGS. 2 and 3. In the drawings, the reference numeral 1 represents an imaging lens or objective, 2 represents an object, 3 represents a light receiving element, 4 represents a beam splitter, 5 and 6 represent minute light collecting lenses and 7 and 8 represent light emitting elements.

Figure 2:
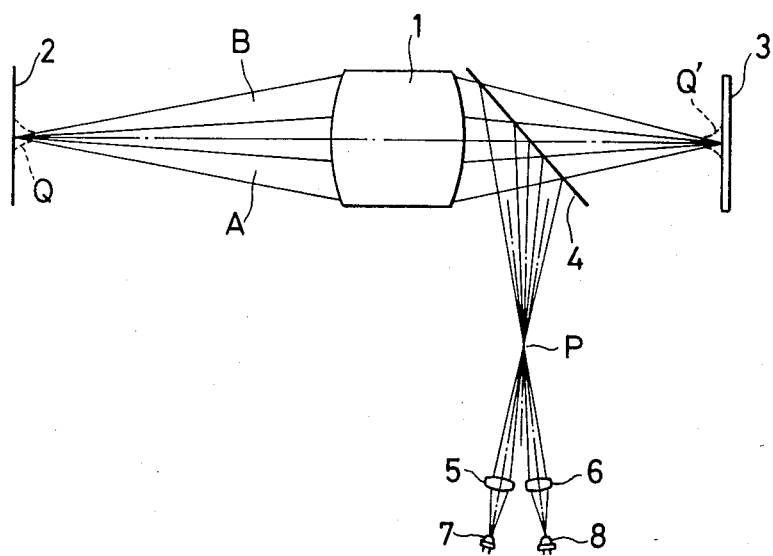
FIGS. 2 and 3 are views for explaining the fundamental principle of the focus detecting device according to the present invention.

FIG. 2 shows an in-focus state wherein a light bundle emitted from the light emitting element 7 passes through the minute lens 5, is then collected in a position P conjugate with the image surface of the lens 1, is further reflected by the beam splitter 4, becomes a light bundle A and is formed to be a spot image Q on the object 2 located in an in-focus position. In case the object 2 is a light dispersing object, the spot image Q will become a light bundle filling the aperture of the lens 1 and will be made to form a spot image Q' on the light receiving element 3 set on the image surface. In case the object 2 is a mirror surface, the spot image Q will become a light bundle B and will be made to form a spot image Q' on the light receiving element 3. On the other hand, the light bundle emitted from the light emitting element 8 passes through the minute lens 6 and is then made in the same manner to form the spot image Q' on the light receiving element 3 (See the light bundle B). Therefore, it is found that, in the case of an in-focus state, both of the point image by the light emitting element 7 and the point image by the light emitting element 8 become a perfectly coinciding identical point on the light receiving element 3.

Figure 3:
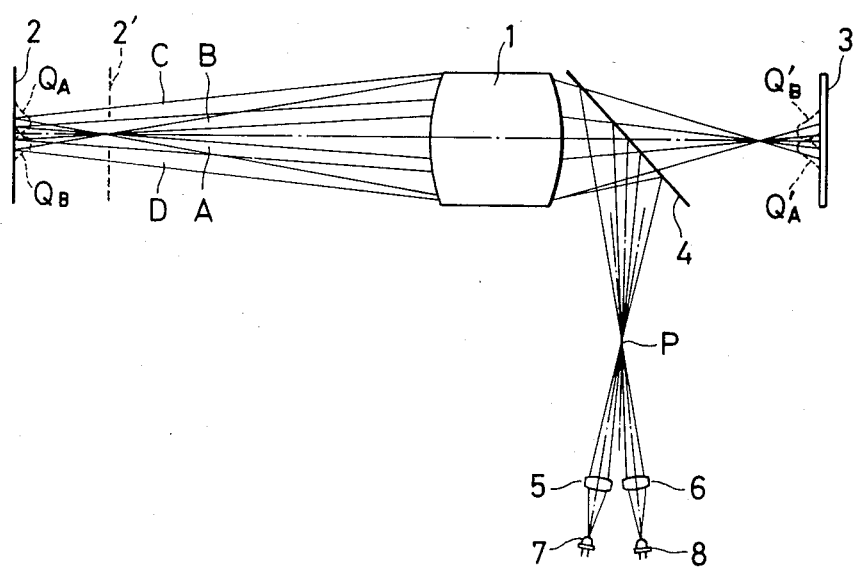

On the other hand, FIG. 3 shows an out-of-focus state wherein the light bundle emitted from the light emitting element 7 passes through the minute lens 5, then passes through the position P conjugate with the image surface of the lens 1, is reflected by the beam splitter 4, becomes a light bundle A from the lens 1 and is made to form an out-of-focus spot image $Q_A$ on the object 2 in an out-of-focus position. By the way, the in-focus position is represented by 2'. In case the object 2 is a light dispersing object, the spot image $Q_A$ will become a light bundle equal in the diameter to the aperture of the lens 1, will pass through the beam splitter 4 and will be made to form an out-of-focus spot image $Q'_{A-}$ on the light receiving element 3. In case the object 2 is a mirror surface, the spot image $Q_A$ will become a light bundle C and will be made to form an out-of-focus spot image $Q_A'$ on the light receiving element 3. On the other hand, the light bundle emitted from the light emitting element 8 passes through the minute lens 6, is then made in the same manner to form an out-of-focus spot image $Q_B$ on the object 2 and is then made to form an out-of-focus spot image $Q'_{B-}$ on the light receiving element 3 (See the light bundles B and D). Thus, in the case of an out-of-focus state, the spot images $Q_A'$ and $Q_B'$ of the light emitting element 7 and 8 on the light receiving element 3 will be formed in different positions.

Here, if the light emitting elements 7 and 8 are alternately lighted and extinguished, in the in-focus state, the position of the point image on the light receiving element 3 will not vary but, in the out-of-focus state, the point image on the light receiving element 3 will become alternately $Q_A'$ and $Q_B'$ and the position will vary. Therefore, in the case of focusing, the lens 1 (the object 2 in the case of a microscope) may be moved so that the point image on the light receiving element 3 may not move.

Also, from the spot image moving direction and moving amount, whether the image forming position is in front or rear of the normal position can be judged and the defocus amount can be measured. Particularly, in case the defocus amount is small, if the angle made by the light bundles by the light emitting elements 7 and 8 is $\theta$ and the spot image moving amount is $\delta$, the defocus amount d on the image side can be determined from the following formula $$d = \frac{\delta}{2 \tan \frac{\theta}{2}} \quad (1)$$

By the way, the light source image to be formed has been described above as a spot image but need not always be a spot image.

Figure 4A:
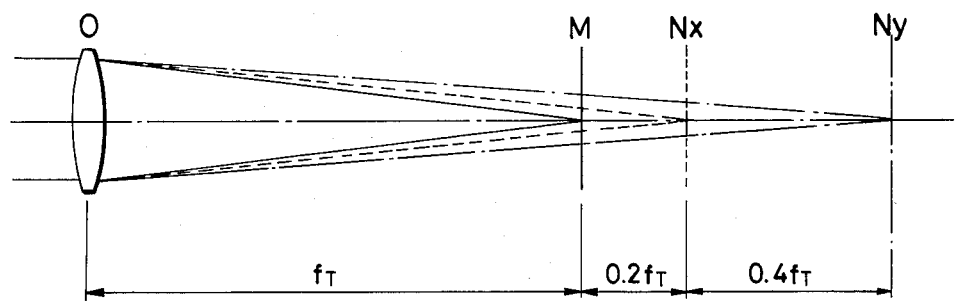
FIGS. 4A, 4B and 4C are views for explaining the image forming states in case the contracting lens system is not arranged and is arranged.

The fundamental principle of the reducing optical system applied to the present invention shall be explained in the following. FIG. 4A shows a manner in which the light from the object is made a parallel light bundle by an objective not illustrated existing on the left side of a tube lens O and this parallel light bundle is made to form an image by the tube lens O. In the drawing, the solid line indicates a visible light and a visible light image is formed in a position M at a distance $f_T$ from the tube lens O. The dotted line indicates an infrared light image forming state in case an objective X is used, an infrared light image is formed in a positive Nx deviated by 0.2 $f_T$ from the position of the visible light image M, the one-dot chain line indicates an infrared light image forming state in case an objective Y is used and an infrared light image is formed in a position Ny further deviated by 0.4 $f_T$. At this time, if the magnification of the visible light image is represented by $\beta$, the infrared light image by the objective X will be 1.2$\beta$ times and the infrared light image by the objective Y will be of a size of 1.6$\beta$ times.

Figure 4B:
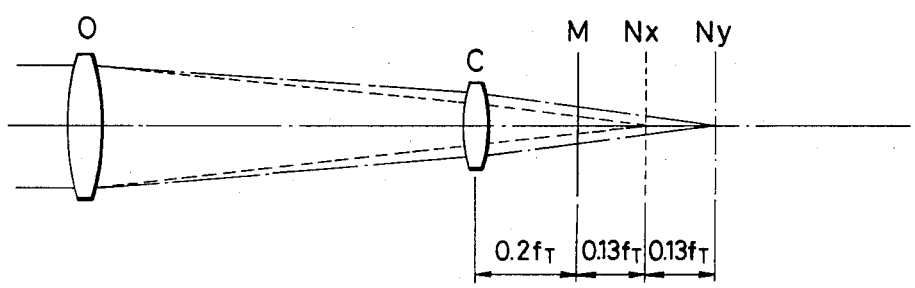

FIG. 4B shows a case that a convex lens C having a focal distance of 2 $f_T$ is provided in a position 0.2 $f_T$ forward of the visible light image M. In this case, the infrared light image Nx by the objective X will be formed in a position 0.13 $f_T$ rearward of M, the infrared light image Ny by the objective Y will be formed in a further 0.13 $f_T$ rearward position and the image magnifications will be respectively $\beta$ and 1.22$\beta$. Thus, if a convex lens is arranged between the tube lens O and visible light image M, the position deviations of the infrared light images by the objectives X and Y will be able to be reduced to be 0.13 $f_T$ from 0.4 $f_T$ when no convex lens is arranged and the variation of the image magnification will become smaller.

Figure 4C:
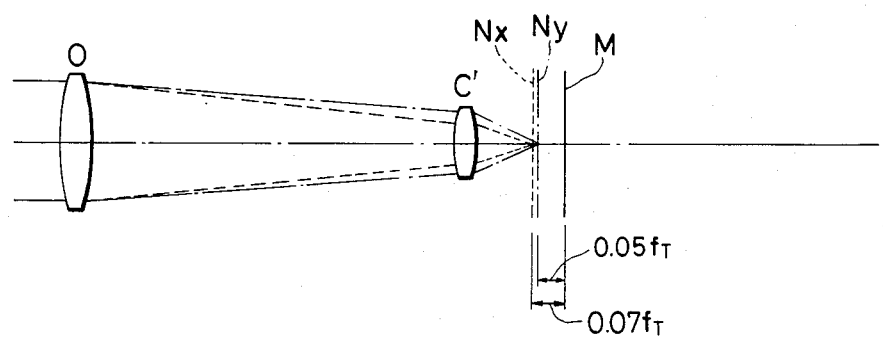

FIG. 4C shows a case that a convex lens C' having a focal distance of 0.2 $f_T$ is arranged in a position 0.2 $f_T$ forward of the visible light image M. The infrared light image Nx by the objective X will be formed 0.07 $f_T$ forward of M and the infrared light image Ny by the objective Y will be formed in a position 0.05 $f_T$ forward of M. The image magnification will be 0.5$\beta$ in the visible light image and will respectively 0.33$\beta$ and 0.25$\beta$ in the infrared light images by the objective X and Y. After all, if a reducing optical system consisting of a convex lens system is arranged between the tube lens O and visible light image M, the infrared light image position deviation by the difference of the objectives will be able to be made so small as to be 0.02 $f_T$ and the image magnification variation will be favorably so small.

Figure 5A:
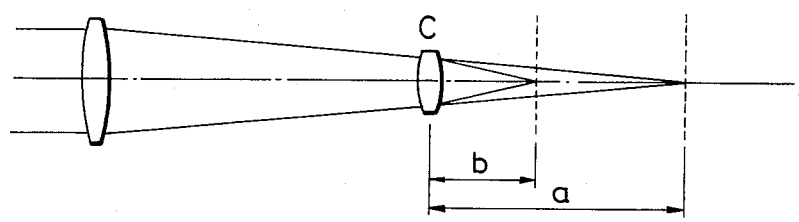
FIGS. 5A and 5B are an explanatory view and graph showing the manner of forming an image with the reducing lens system.
Figure 5B:
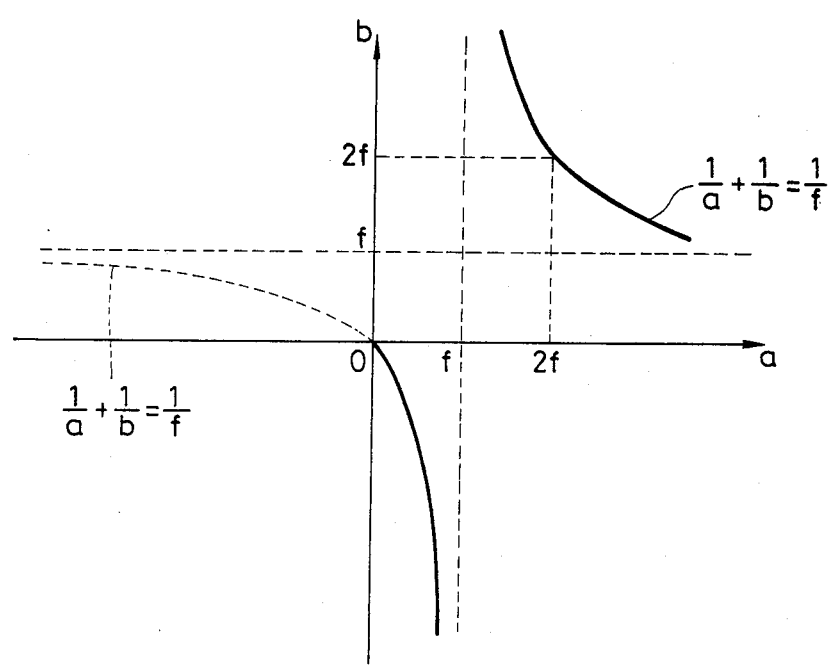

Here, in case a virtual image at a distance of a from the lens surface is projected to a position at a distance of b from the lens surface by a reducing lens C of a focal distance f as shown in FIG. 5A, a formula $$\frac{1}{a} + \frac{1}{b} = \frac{1}{f}$$

will hold. The relation between a and b in this case is shown in FIG. 5B. In this graph, the range indicated by the dotted lines satisfies the conditions explained by using both of the above described FIGS. 4B and 4C. That is to say, even if the distance a greatly varies, the variation of the distance b will be small.

Particularly, in case the distance b is close to the focal distance of the reducing lens, that tendency is remarkable. By the way, in practice, when the back side focus of the contracting lens is made to substantially coincide with the image forming surface, the back side focus will be rearward of the middle of the tube lens and image forming surface. That is to say, it is preferable to use a lens system of a focal distance less than about ½ that of the tube lens as arranged so that the back side focus may not separate so much from the image forming surface.

As described above, when a reducing optical system is provided between the objective or tube lens and its image forming surface, the infrared light image position deviation will be able to be reduced. Therefore, there can be provided a focus detecting device which can respond to the use of various different objectives by only adjusting the electric system of the circuit forming the focus detecting device.

Figure 6:
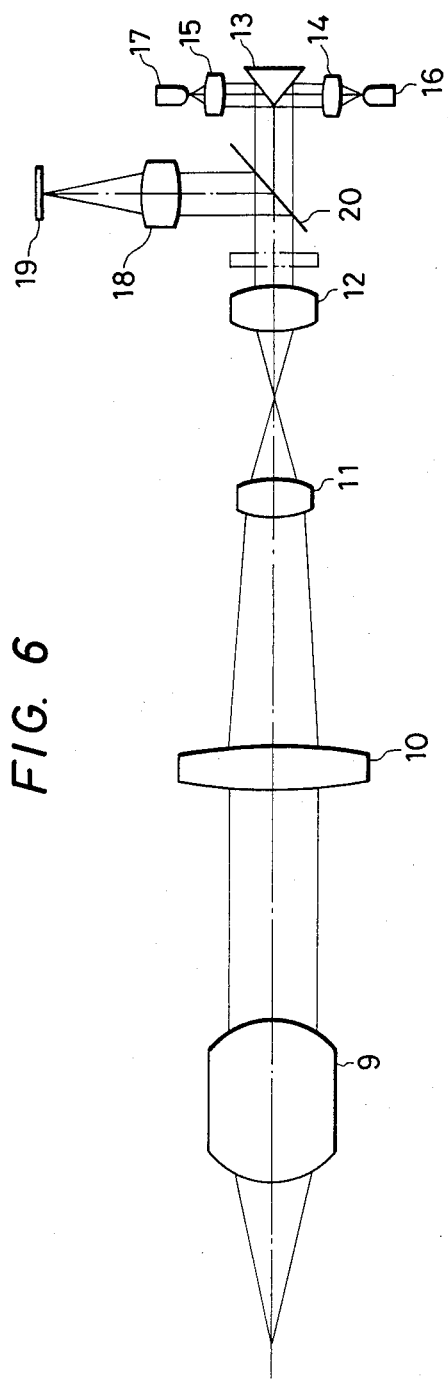
FIG. 6 is a view showing the first embodiment of a focus detecting optical system including the reducing optical system according to the present invention.

FIG. 6 shows a first embodiment in the case that the present invention is applied to a microscopic optical system by using a focusing device of the above-mentioned principle. In the drawing, the reference numeral 9 represents an objective, 10 represents a tube lens, 11 represents a reducing lens, 12 represents a lens projecting an infrared light spot, 13 represents a prism, 14 and 15 represent minute lenses, 16 and 17 represent such light emitting elements as, for example, laser diodes, 18 represents a detecting lens, 19 represents a light receiving element and 20 represents a beam splitter. The light alternately emitted from the light emitting elements 16 and 17 passes through the minute lenses 14 and 15, is changed in the direction by the prism 13, passes through the beam splitter 20, is projected onto an image surface by the projecting lens 12, further passes through the reducing lens 11, tube lens 10 and objective 9 and is projected onto a sample. The light reflected from the sample passes again through the objective 9, tube lens 10, reducing lens 11 and projecting lens 12, is reflected by the beam splitter 20 and is made to produce a spot on the light receiving element 19 by the detecting lens 18.

The beam splitter 20 may be a polarizing beam splitter but, in such case, a $\lambda/4$ plate is arranged in a proper position between the beam splitter and sample as indicated by the chain line in FIG. 6.

Figure 7:
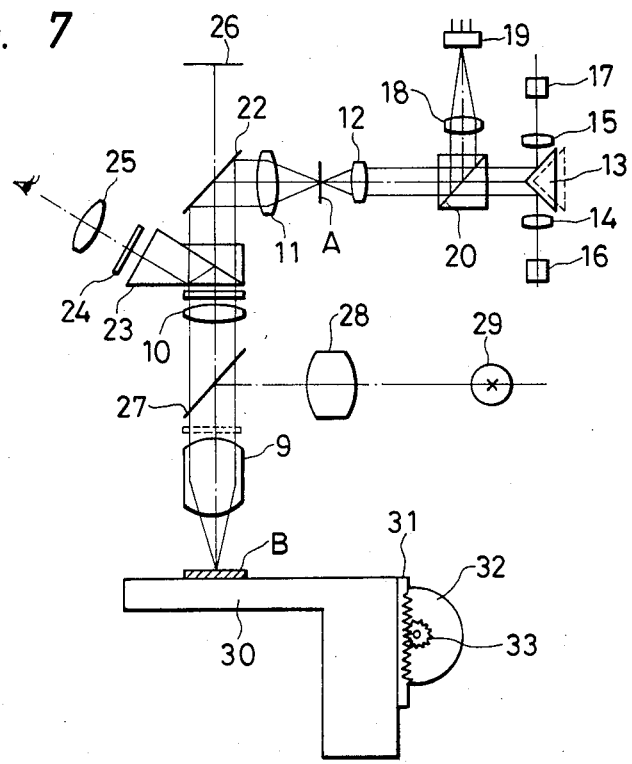
FIG. 7 is a view showing an example of a microscopic optical system provided with the focus detecting optical system according to the present invention.

FIG. 7 shows an embodiment of the microscope device using the optical system by the above-mentioned first embodiment. Here, the same reference numerals are given respectively to the same elements as are shown in FIG. 6. The reference numeral 22 represents a dichroic mirror, 23 represents a prism having a half-mirror surface, 24 represents an infrared light cutting filter, 25 represents an eyepiece and 26 represents a film. These together with the objective 9 and tube lens 10 form an observing and photographing optical system. The reference numeral 27 represents a half-mirror, 28 represents a condenser lens and 29 represents an illuminating light source. These together with the objective 9 form an illuminating optical system. The reference numeral 30 represents a stage having a rack 31 and movable in the optical axis direction (vertical direction) and 32 represents a motor in which a pinion 33 meshing with a rack 31 is fixed to a rotary shaft to drive the stage 30.

As the device in FIG. 7 is formed as mentioned above, the infrared light emitted alternately from the light emitting elements 16 and 17 is projected onto a sample B through the minute lenses 14 and 15, prism 13, beam splitter 20, projecting lens 12, contracting lens 11, tube lens 10 and objective 9, then passes again through the objective 9, tube lens 10, dichroic mirror 22, contracting lens 11 and projecting lens 12, is reflected by the beam splitter 20 and is made to produce a spot image on a PSD 19 which is a light receiving element by the detecting lens 18. In the case of an out-of-focus state, the spot images of the light emitting elements 16 and 17 on the PSD 19 will be detected respectively in different positions and therefore will be alternately moved by lighting and extinguishing the light emitting elements 16 and 17. In the case of an in-focus state, both of the spot images of the light emitting elements 16 and 17 will be formed in the same position and therefore will not be moved even by lighting and extinguishing both light emitting elements. As a result, a focusing operation is made by moving the sample B without moving the spot images. Also, from the moving direction and amount of the spot images accompanying the focusing operation, whether the image position is in front or rear of the normal position can be judged and the defocus amount can be measured.

Figure 8:
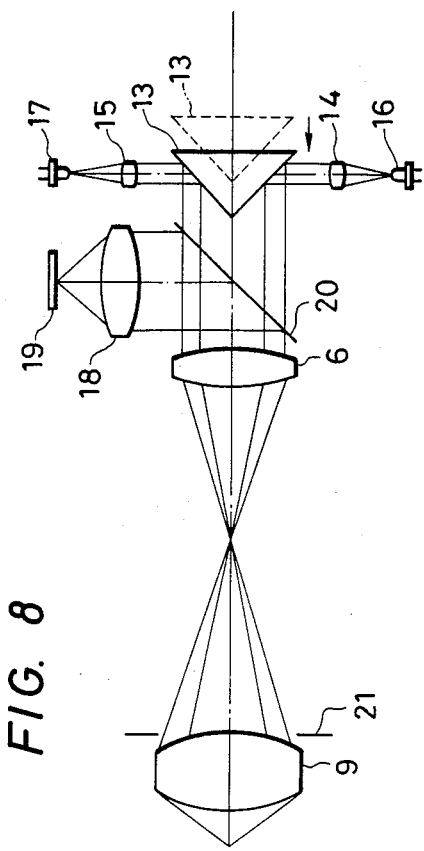
FIG. 8 is a view for explaining the operation of the light path changing means in FIG. 7.

By the way, in this case, by moving the prism 13 in the optical axis direction as indicated by the broken line, a light bundle can be projected in confirmity with the pupil diameter of the objective 9. That is to say, if the prism 13 is moved in the direction indicated by the arrow in FIG. 8, the light bundle will be deviated in the direction away from the optical axis so as to be able to be incident in conformity with a larger pupil diameter. If the prism 13 is moved against the direction indicated by the arrow, the light bundle will shift in the direction approaching the optical axis so as to be able to be incident in conformity with a smaller pupil diameter. Therefore, the defects that in case the diameter of the incident light bundle is smaller than the pupil diameter of the objective 9, the focal depth will become deeper and the focus detecting precision will deteriorate and that, in case the diameter of the incident light bundle is excessively larger than the above-mentioned pupil diameter, the effective utilizable light amount will decrease and the focus detecting precision will deteriorate are dissolved and, on all objectives, a high detecting precision and detecting sensitivity are obtained.

Figure 9:
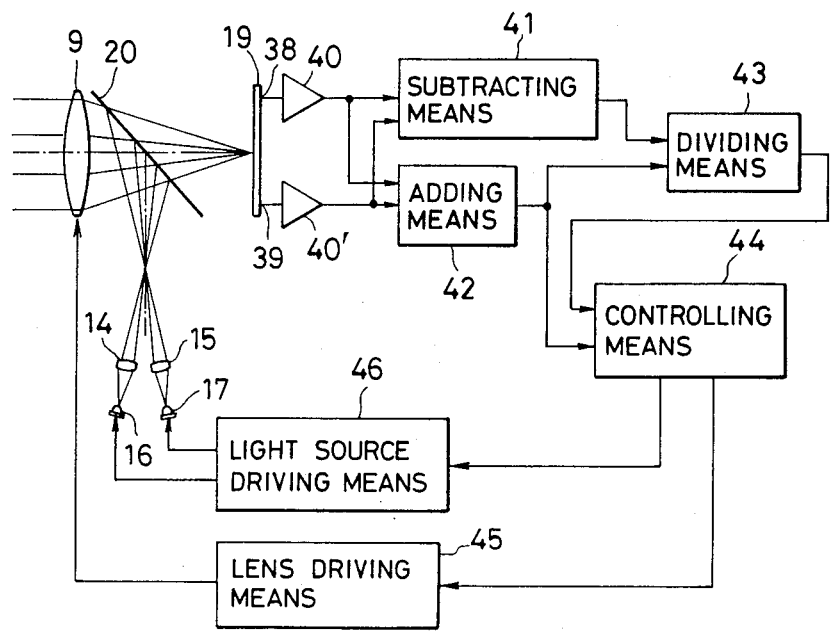
FIG. 9 is a block diagram of a signal processing device used together with the focus detecting optical system according to the present invention.
Figure 10:
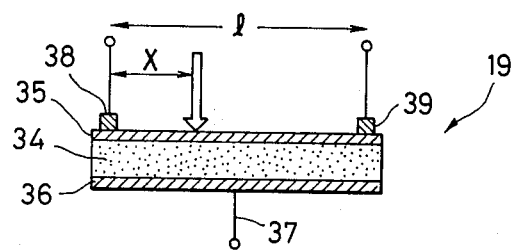
FIG. 10 is a sectional view showing an example of the structure of the light receiving element.

FIG. 9 shows a signal processing device applicable to the above-mentioned respective embodiments. First of all, the detailed structure of the light receiving element 19 shall be explained with reference to FIG. 10. The reference numeral 34 represents an Si substrate having a high resistance, 35 represents a p-type resistance layer, 36 represents an n+ layer, 37 represents a common electrode and 38 and 39 represent electrodes. The surface layer is to develop a photoelectric effect with a p-n junction. Therefore, when a light enters the p-type resistance layer 35, respective output currents $I_A$ and $I_B$ will be obtained from the electrodes 38 and 39 in response to the entering position. Here, if the distance between the electrodes 38 and 39 is represented by l, the resistance is represented by Rl, the distance from the electrode 38 to the light entering position is represented by x, the partial resistance is represented by Rx and the photoelectric current generated by the entering light is represent by $I_O$, $$I_A = \frac{Rl - Rx}{Rl} \cdot I_O \text{ and } I_B = \frac{Rx}{Rl} \cdot I_O \tag{2}$$

is made. If the resistance layer is uniform, the following formulae is obtained:

$$I_A = \frac{l - x}{l} \cdot I_O \text{ and } I_B = \frac{x}{l} \cdot I_O \tag{3}$$

Therefore, when the formula of $$\frac{I_A - I_B}{I_A + I_B} = \frac{l - 2x}{l} \tag{4}$$

is operated from the output currents $I_A$ and $I_B$ of the electrodes 38 and 39, the light entering position, that is, the distance x is determined irrespective of the entering energy, that is, the entering light amount. By the way, the entering light amount is determined from the following formula:

$$I_O = I_A + I_B \tag{5}$$

Figure 11:
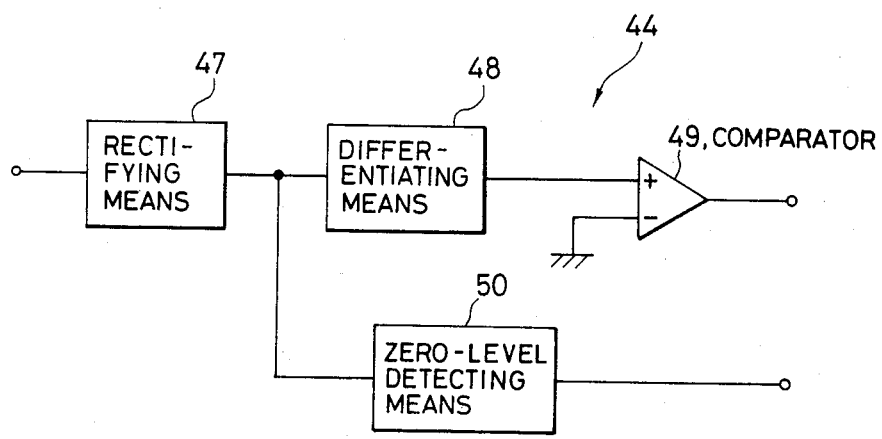
FIG. 11 is a block diagram showing the detailed formation of a control circuit in the above-mentioned signal processing device.

Again, in FIG. 9, the reference numerals 40 and 40' represent current amplifiers for amplifying the output currents $I_A$ and $I_B$ from the two electrodes 38 and 39 of the light receiving element 19. The outputs are represented by $V_A$ and $V_B$. The reference numeral 41 represents a subtracting means for calculating $(V_A - V_B)$, 42 represents an adding means for calculating $(V_A + V_B)$ and 43 represents a dividing means for calculating $(V_A - V_B)/(V_A + V_B)$ (corresponding to the formula (4)). The reference numeral 44 represents a controlling means for controlling a stage driving means 45 in response to the output signal after the direct current bias component is removed from the output signal of the dividing means 43. Its circuit formation is, for example, as shown in FIG. 11. That is to say, the reference numeral 47 represents a rectifying means, 48 represents a differentiating means, 49 represents a comparator, and 50 represents a zero-level detecting means. The alternating current output signal from the dividing means 43 is converted to a direct current signal by the rectifying means 47. Whether the direct current signal is positive or negative is judged by the comparator through the differentiating means 48 and whether the above-mentioned signal is decreasing or increasing is judged. In case it is increasing, the stage driving direction is reversed, an in-focus state is detected by detecting with the zero-level detecting means 50 that the signal has become zero and the stage driving is stopped. By the way, the reference numeral 46 represents a light source driving means for alternately lighting and extinguishing the light emitting elements 16 and 17.

Figure 12A:
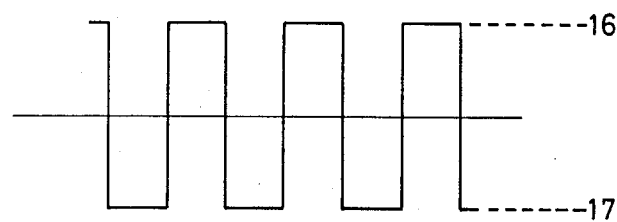
FIGS. 12A to 12E are views showing signal processing steps by the above-mentioned signal processing device.
Figure 12B:
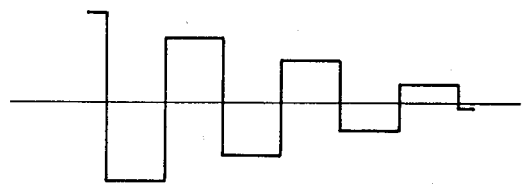
Figure 12C:
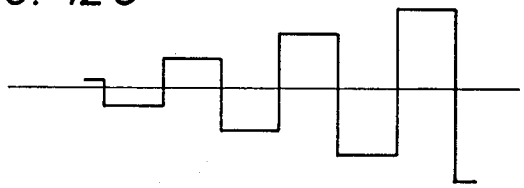
Figure 12D:
Figure 12E:
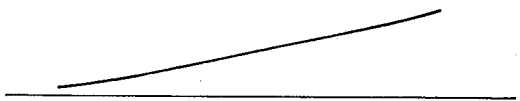

As the focus detecting device according to the present invention is formed as described above, when the stage 30 is placed in a fixed position and the light sources 16 and 17 are made to alternately emit a light by the light source driving means 46, in an out-of-focus state, a signal of a fixed amplitude, for example, as shown in FIG. 12A will be put out of the dividing means 43. Here, the amplitude of this signal becomes a criterion of the deviation from the in-focus state and means that, if the amplitude=0, an in-focus state will be made. Therefore, if the stage 30 is moved little by little along the optical axis, the output signal of the dividing means 43 will vary to be such signal as in shown in FIG. 12B or 12C. If this signal is rectified and smoothed by the rectifying means 47, it will vary to be such signal as is shown in FIG. 12D or 12E. Therefore, if this is differentiated by the differentiating means 48, the inclination of the envelope of the signal variation will be obtained. If this inclination is negative, the in-focus state will be being approached but, if it is positive, the in-focus state will be being separated. Therefore, whether it is positive or negative is judged by the comparator. If a reversely rotating signal in case the inclination is positive and a normally rotating signal in case it is negative are respectively applied to the lens driving means 45, the stage 30 will be moved toward the in-focus state. When the amplitude=0, if the movement of the stage 30 is stopped, the in-focus state will be obtained.

The focus is thus detected by the device of the present invention. According to the present invention, as no pupil dividing means is required, the optical system is simple and, as the light receiving element may be one of a simple structure, the signal processing system is simple and is easy to adjust. As both of the optical system and signal processing system are simple, the entire formation is simple. As a result, the device of the present invention can be reasonably incorporated into optical instruments and medical instruments. As a semiconductor position detector is used for the light receiving element, the signal can be put in with a real time. As a result, the focusing speed increases. If the magnification of the system including the objective is represented by $\beta$, the stage movement d' can be determined from $$d' = \frac{\delta}{2\beta^2 \tan \frac{\theta}{2}} \tag{6}$$

from the formula (1).

Figure 13:
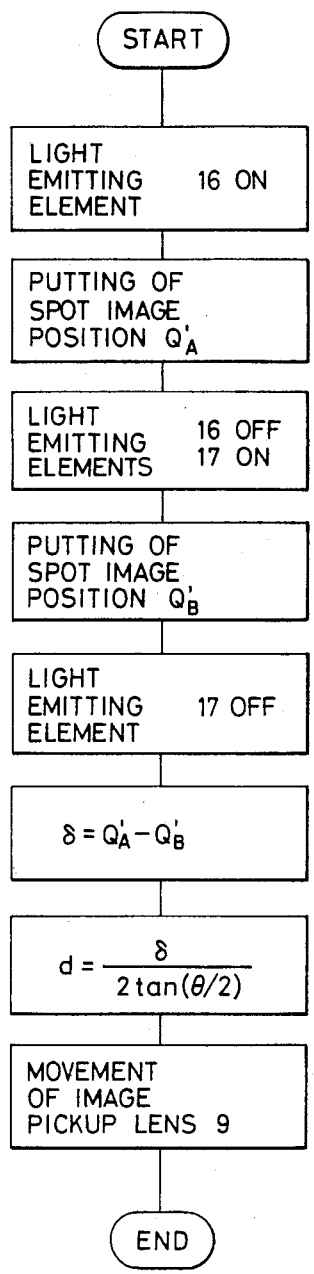
FIG. 13 is a view showing a flow chart in the case of using a microprocessor for the above-mentioned signal processing device.

FIG. 13 shows a flow chart in the case that a simple microprocesser is used for the above-mentioned controlling means 44. First of all, the light emitting element 16 is set ON, the spot image position $Q_A'$ at this time is put in, then the light emitting element 17 is set ON and the spot image position $Q_B'$ at this time is put in. Then, the difference (image deviation) $\delta = Q_A' - Q_B'$ is determined. The sign of $\delta$ indicates the defocus direction. The absolute value of $\delta$ corresponds to the defocus amount. Then, the above-mentioned formula (1) is calculated, the image deviation δ is converted to a defocus amount d and the stage 30 is driven to obtain an in-focus state. At this time, in case the defocus amount d is large, the light bundle from the light emitting elements 16 and 17 returning as reflected from the sample B will be cut by the lens frame or the like and will reduce in the light amount. Therefore, in case the defocus amount is large, if the light amount $(V_A+V_B)$ obtained by the light receiving element 19 is detected, the stage 30 is driven so that this value may become large and the light receiving element 19 is enabled to detect the positions of the spot images $Q_A$ and $Q_B$, the focusing speed will be able to be increased. By the way, any ordinary lamp, LED, laser or semiconductor laser may be used for the light emitting elements 16 and 17 but practically an infrared LED or infrared semiconductor laser is adapted. For the light receiving element 19, there may be used such image sensor as of a so-called CCD type or MOS type instead of the semiconductor position detector.

Figure 14:
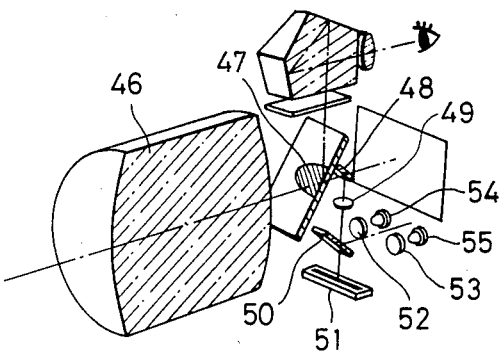
FIG. 14 is a perspective view of an essential part of a single-lens reflex camera provided with the focus detecting optical system according to the present invention.

The case of applying the above-mentioned principle to a single-lens reflex camera further as another embodiment shall be explained in the following. FIG. 14 shows such optical system. The reference numeral 46 represents an imaging lens, 47 represents a beam splitter provided in a quick return mirror, 48 represents a mirror, 49 represents a reducing lens, 50 represents a beam splitter, 51 represents a light receiving element, 52 and 53 represent minute lenses and 54 and 55 represent light emitting elements. As in the above, the same optical system as in FIG. 6 is set in a single-lens reflex camera. In this case, the signal processing system explained with reference to FIG. 9 can be utilized as it is by replacing the part of driving the stage 30 with the means of driving the lens 46 and therefore its formation and operation shall not be particularly explained.

Figure 1B:
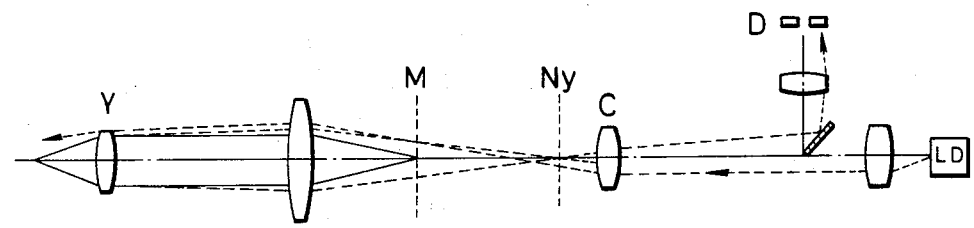
Figure 1C:
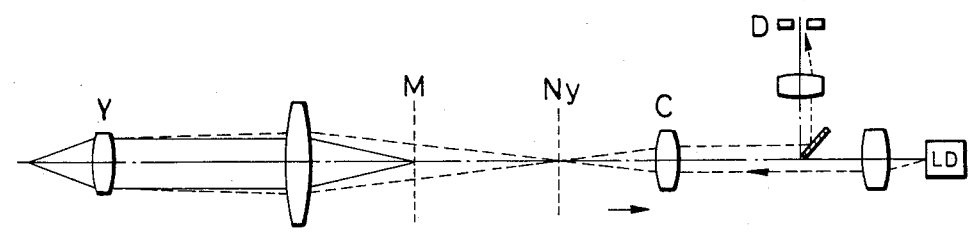

In each of the above described embodiment, the light source has been explained to consist of a pair of lighting and extinguishing LED's but such optical system as is shown in FIGS. 1A to 1C can be used instead of them. That is to say, the optical system provided with the reducing lens of the present invention can be applied also to a system wherein a single LED is made a light source, the light emitted from this light source is projected onto an object through a half of the pupil of an objective, only the component having passed through the remaining half of the pupil of the objective of the reflected light is received by a light receiving element and the in-focus state is detected by the fluctuation of the position of the light receiving point on the light receiving element. In this case, too, the same as in the already described embodiments, even without a correcting lens, the focus can be detected at a high precision.

By the way, the optical system utilizing the reducing lens according to the present invention can be extensively applied to a general focus detecting device of a TTL light projecting type (wherein a light is projected onto an object through an optical system or an objective to be detected whether in an in-focus position or not and the reflected light from the object is received through the same optical system or objective to detect the focus).

What is claimed is:

1. A focus detecting device adapted to detect a focus by using an infrared light, comprising a light source means alternately emitting alternate infrared light bundles made to pass through different courses in an optical system including therein an objective, a reducing optical system arranged between said objective and the position of an object image to be formed by said objective and having a positive refractive power to reduce a deviation of the position of an infrared light image formed in a position different with said objective to be used, a light receiving element capable of detecting the position of the infrared light image reflected from the object and having passed through said objective and reducing optical system and a signal processing means connected to said light receiving element and capable of detecting the out-of-focus deviation of the infrared light image formed alternately by the output signal from said light receiving element in accordance with said light bundles.

2. A focus detecting device adapted to detect a focus by using an infrared light, comprising a light source means alternately emitting alternate infrared light bundles made to pass through different courses in an optical system including therein an objective and tube lens, a reducing optical system arranged between said tube lens and the position of an object image to be formed by said tube lens and having a positive refractive power to reduce a deviation of the position of an infrared light image formed in a position different with said objective to be used, a light receiving element capable of detecting the position of the infrared light image reflected from the object and having passed through said objective, tube lens and reducing optical system and a signal processing means connected to said light receiving element and capable of detecting the out-of-focus deviation of the infrared light image formed alternately by the output signal from said light receiving element in accordance with said light bundles.

3. A focus detecting device according to claim 2 wherein said reducing optical system is arranged on the image forming surface side from the intermediate position between said tube lens and the image forming surface of said tube lens.

4. A focus detecting device according to claim 1 wherein said reducing optical system is arranged on the image forming surface side from the intermediate position between said objective and the image forming surface of said objective.

5. A focus detecting device according to claim 1 further comprising a light path changing means arranged between said objective and light source means and for passing the infrared light from said light source means through the periphery of the pupil of said objective.

6. A focus detecting device according to claim 2 further comprising a light path changing means arranged between said tube lens and light source means and for passing the infrared light from said light source means through the periphery of the pupil of said objective.

7. A focus detecting device according to claim 5 or 6 wherein said light path changing means is a prism having a reflecting surface for leading the infrared light from said light source means toward said objective and arranged movable on the optical axis.

8. A focus detecting device according to claim 1 or 2 wherein said light source means comprises a pair of light emitting elements capable of being alternately lighted and extinguished and a pair of minute lenses arranged respectively in front of said light emitting elements.

9. A focus detecting device according to claim 8 wherein said light emitting element is an infrared LED and said light receiving element is any one of a CCD-type image sensor and MOS-type image sensor.

10. A focus detecting device according to claim 8 wherein said light emitting element is an infrared semiconductor laser and said light receiving element is any one of a CCD-type image sensor and MOS-type image sensor.

11. A focus detecting device adapted to detect a focus by using an infrared light, comprising:
- a light source means projecting an infrared light bundle onto an object via an area deviating from the optical axis on the pupil plane of an objective lens;
- a reducing optical system arranged between said objective lens and the position of an object image to be formed by said objective lens and having a positive refractive power to reduce a deviation of the position of an infrared light image formed in a position different with said objective lens to be used;
- a light-receiving element capable of detecting the position of the infrared light image reflected from the object and having passed through said objective lens and reducing optical system; and
- a signal processing means connected to said light-receiving element and capable of detecting the out-of-focus deviation of the infrared light image formed by the output signal from said light-receiving element.

* * * * *